(12) United States Patent
Fujita et al.

(10) Patent No.: US 6,411,872 B1
(45) Date of Patent: Jun. 25, 2002

(54) VEHICLE CONTROLLING APPARATUS

(75) Inventors: Masahide Fujita; Kohji Hashimoto; Katsuya Nakamoto, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/919,852

(22) Filed: Aug. 2, 2001

(30) Foreign Application Priority Data

Feb. 6, 2001 (JP) ........................................ 2001-030005

(51) Int. Cl.[7] .................................................. G06F 7/00
(52) U.S. Cl. ........................... 701/29; 701/31; 180/117; 180/118; 60/711
(58) Field of Search ...................... 701/29, 31; 180/117, 180/118; 60/706, 711, 712

(56) References Cited

U.S. PATENT DOCUMENTS 4,858,135 A * 8/1989 Clish et al. ................... 701/93
6,209,672 B1 * 4/2001 Severinsky ................ 180/65.2

FOREIGN PATENT DOCUMENTS

| JP | 5-18315 | 1/1993 | ........... F02D/45/00 |
| JP | 5-81222 | 4/1993 | ........... G06F/15/16 |
| JP | 7-196003 | 8/1995 | ........... B60R/21/32 |
| JP | 8-33908 | 12/1996 | ........... G06F/11/00 |

* cited by examiner

Primary Examiner—Gertrude Arthur
(74) Attorney, Agent, or Firm—Sughrue Mion, PLLC

(57) ABSTRACT

To secure normal operation and then restart a microprocessor (CPU) when a CPU built into an on-vehicle electronic apparatus runs away. A number of on-vehicle loads driven from a CPU, a watchdog timer for monitoring the CPU to reset and restart it on occurrence of an abnormality, and a memory element for storing generation of the reset output are provided, and load driving elements or a load relay is rendered inoperative by output of the memory element. The memory element is reset by cutting off or reclosing the power switch, and an on-vehicle electronic apparatus returns to a normal state.

7 Claims, 4 Drawing Sheets

VEHICLE CONTROLLING APPARATUS

BACKGROUND OF THE INVENTION

1. Field of the Invention

The present invention relates to a vehicle controlling apparatus, in an on-vehicle electronic apparatus with a built-in microprocessor used for a vehicle-engine controlling apparatus for instance, which is improved for restarting a microprocessor with secured safety when the microprocessor is out of control, and in particular to a vehicle controlling apparatus having a function of monitoring runaway of a microprocessor.

2. Description of the Prior Art

There are various known technologies as follows related to runaway monitoring and restart control of a microprocessor.

For instance, Japanese Patent Laid-Open No. 7-196003 describes an AND circuit provided on a driving circuit of a vehicle safety apparatus of which drive is controlled by a microcomputer so that a vehicle safety apparatus such as an air bag is driven by a logical product of output of a discrimination circuit generating an operation permission signal when a watchdog pulse of the microcomputer is normal and an operation instruction signal of the microcomputer.

In this case, there is a problem that, if the microcomputer is restarted by a reset pulse, a vehicle driver cannot recognize occurrence of a temporary runaway of the microcomputer.

In addition, Japanese Patent Laid-Open No. 5-81222 describes a system comprised of two CPUs, namely a main CPU and a sub CPU wherein, in the case of a runaway or a failure of the main CPU, both CPUs are initialized or restarted by a reset signal outputted from a watchdog timer circuit provided outside, and in the case of a runaway or a failure of the sub CPU, the main CPU monitors it and outputs a reset signal to the sub CPU to initialize or restart it.

In this case, there is also a problem that, if the microcomputer is restarted by a reset pulse, the vehicle driver cannot recognize a temporary runaway of the microcomputer.

Besides, as a public domain technology related to the present invention, Japanese Patent Laid-Open No. 5-18315 describes an actuator of which drive is controlled by a microprocessor built into an engine controlling apparatus is initialized by feeding the engine controlling apparatus via a power relay driven by a power switch, and the above power relay operation is continued even after shutting off the power switch to cut off the power relay by finishing the initialization.

In this case, it is also configured so that, if the microcomputer is restarted by a reset pulse, the vehicle driver cannot recognize a temporary runaway of the microcomputer.

On the other hand, Japanese Patent Laid-Open No. 8-339308 describes a configuration wherein a microcomputer is completely stopped by detecting a malfunction of the microcomputer by a watchdog timer, and to recover it, supply of operating power of the microcomputer must be stopped once and then it must be supplied again.

In this case, its characteristic is that the microcomputer is not restarted unless the power switch is opened and closed, so the vehicle driver can recognize that the microcomputer had a malfunction.

BRIEF SUMMARY OF THE INVENTION

OBJECT OF THE INVENTION

Incidentally, as for these conventional apparatuses, malfunctions of an electronic apparatus can be broadly divided into a hardware failure of the microprocessor and peripheral circuits or temporary runaway trouble due to a noise malfunction of the microprocessor and so on, and the driver can recognize the hardware failures due to continuation of the phenomenon.

However, while the driver does not need to recognize a temporary runaway trouble due to a noise malfunction of the microprocessor and so on if it can be reset for automatic recovery, it is desirable, in the case where such a malfunction repeatedly occurs, to recognize it so as to take some follow-up measures.

In the case of the aforementioned Japanese Patent Laid-Open No. 8-339308 capable of recognizing this, the microprocessor is completely stopped once a runaway starts regardless of whether it is temporary or not.

However, completely stopping the vehicle is not necessarily the best for safety of the vehicle, and there are quite a few loads wherein, if the runaway is temporary, it is more desirable to immediately restart it if possible.

The present invention is implemented in order to solve the above problem and, its object is to provide a simple vehicle controlling apparatus capable of, in the case of a runaway of the microprocessor, immediately attempting to reset and restart it and. also forcing only the operation of loads to which a malfunction is detrimental to stop and releasing the forced stop by shutting off or reclosing of the power switch.

Another object of the present invention is to provide a simple vehicle controlling apparatus capable of, even in the case of forcedly stopped loads, releasing the forced stop while the power switch is shut off and the engine is stopped so as to allow the actuator's operation for returning to its initial position.

SUMMARY OF THE INVENTION

A vehicle controlling apparatus related to the invention of claim 1 has a manually-operated power switch for on-vehicle engine operation, a first controlling means fed from an on-vehicle battery when the power switch is closed for controlling a plurality of on-vehicle loads, a monitoring means for monitoring the first controlling means and generating a reset pulse to restart the above first controlling means on a malfunction, storage means for storing generation of a reset pulse from the monitoring means, and an output stopping means for stopping operation of a load relay provided on a feeder circuit to the above on-vehicle load in response to operation of the storage means, and the above storage means is reset on opening or reclosing of the above power switch.

For instance, it is possible, in the case where a controlling means such as a microprocessor malfunctions or runs away due to noise, to stop operation of part of on-vehicle loads and release this stopping state until opening or reclosing of the power switch even if the microprocessor is restarted by reset pulse output, so that the on-vehicle loads involved in ordinary driving, for instance, will return to normal operation but output will be continuously stopped as to convenience improving devices related to reliability so as not to release this stopping state unless there is a purposeful operation of opening and closing the power switch, allowing the convenience improving devices to be adopted in a reassuring manner to contribute to improved reliability of the apparatus.

The vehicle controlling apparatus related to the invention of claim 2 has, in the invention of claim 1, a power relay for feeding the above first controlling means from the above on-vehicle battery on closing of the above manually-operated power switch, a delay outputting means for continuing operation of the above power relay after opening of the above power switch until part of the above on-vehicle loads returns to an initial position based on output of the above first controlling means, and a resetting means for resetting the above storage means on opening of the above power switch.

Even in the case where output is continuously stopped to on-vehicle loads such as an actuator requiring return to initial position on opening of the power switch due to noise malfunction or a runaway of controlling means such as a microprocessor for instance, it allows the return to the initial position since the power switch is opened and the vehicle has stopped and it thus produces an effect of enabling preparatory operations for the next driving to be made without losing reliability.

The vehicle controlling apparatus related to the invention of claim 3 has, in the invention of claim 1, a second controlling means for controlling on-vehicle loads other than the above plurality of on-vehicle loads, and monitoring of the above second controlling means and a restarting reset thereof on a malfunction are performed by the above first controlling means.

It has an effect of, if any microprocessor as controlling means malfunctions or runs away, immediately restarting it by reset pulse output and storing this state to continuously stop output of part of on-vehicle loads.

The vehicle controlling apparatus related to the invention of claim 4 has the above storage means operate in the invention of claim 3 based on logical sum output of a reset pulse from the above monitoring means and a reset pulse to the above second controlling means.

It has an effect of efficiently restarting the microprocessor on a malfunction or a runaway and storing this state to continuously stop output of part of on-vehicle loads.

The vehicle controlling apparatus related to the invention of claim 5, in the invention of claim 3, has the above storage means count the number of times of output of a reset pulse to the above first or second controlling means and operate the above output stopping means in response to generation of a reset pulse exceeding a predetermined number of times to stop operation of the above load relay.

It has an effect of, if the microprocessor or the sub-microprocessor as the first or second controlling means malfunctions or runs away as a very rare case, not continuously stopping output, but continuously stopping output in the case of repeated malfunctions or runaways and thus not wastefully losing the controlling function.

The vehicle controlling apparatus related to the invention of claim 6 has, in the invention of claim 3, a malfunction warning means for, in response to the operation of the above storage means, instructing to outside that the above first or second controlling means are malfunctioning and restarted by a reset operation.

It has an effect of, if there are on-vehicle loads of which output is continuously stopped due to a malfunction or a runaway of the first or second controlling means, aggressively warning outside of it in the case where a driver outside, for instance, cannot recognize it.

The vehicle controlling apparatus related to the invention of claim 7 uses, in the invention of claim 1, a watchdog timer as the above monitoring means.

It has an effect of, in the case where the microprocessor or the like malfunctions or runs away, securely monitoring and coping with it to contribute to improved reliability of the apparatus.

DETAILED DESCRIPTION OF THE PREFERRED EMBODIMENTS

Embodiments of the present invention will be described hereafter by referring to drawings.

Embodiment 1

Figure 1:
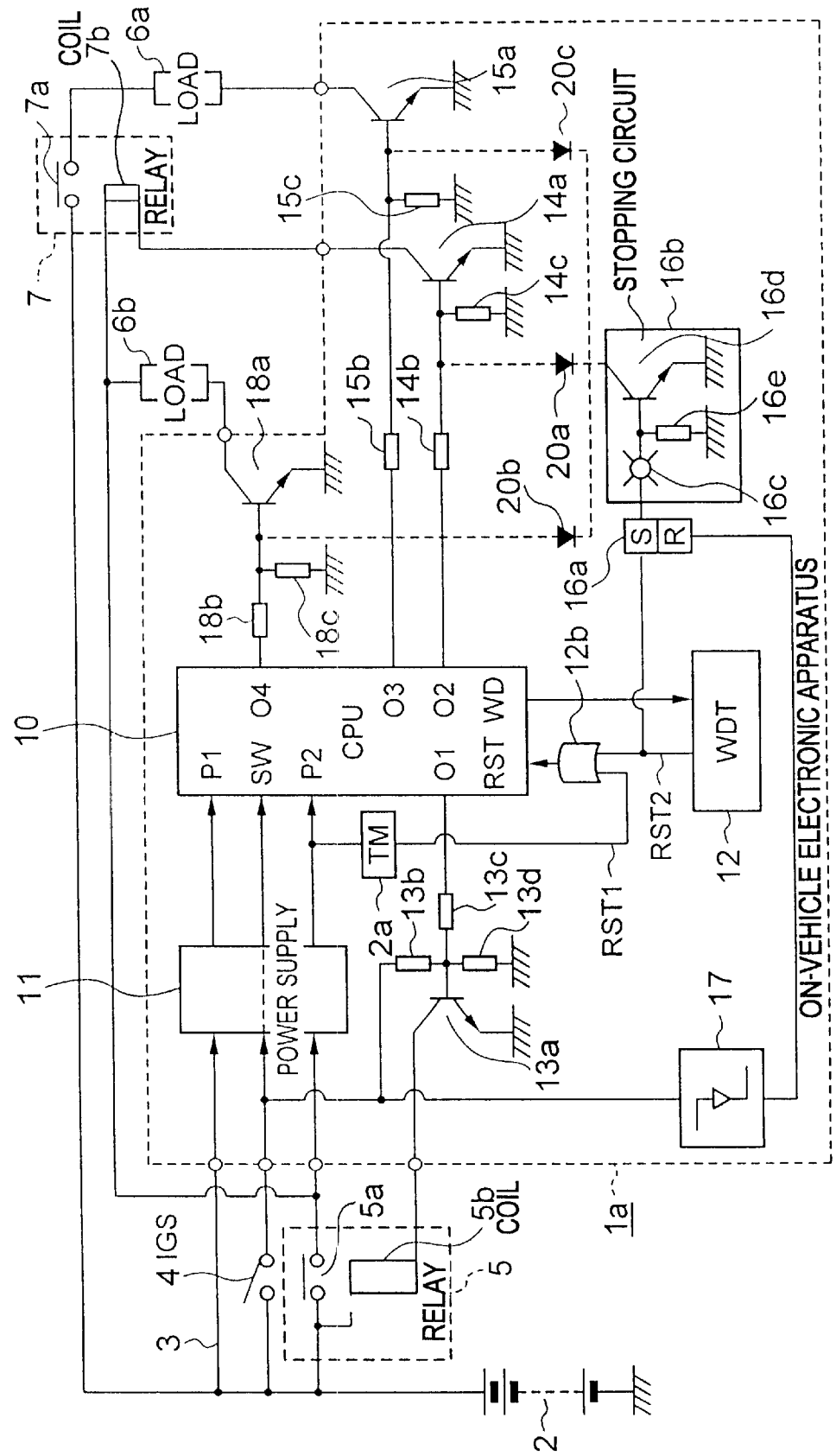
FIG. 1 is a block circuit diagram showing an embodiment 1 of the present invention.

FIG. 1 is a block diagram showing an embodiment 1 of the present invention.

As shown in FIG. 1, an on-vehicle electronic apparatus 1a comprises a microprocessor 10 and peripheral circuits of various memories and so on mentioned later. Also provided are on-vehicle battery 2, a sleep power code 3 for maintaining operation of a RAM memory and so on inside the on-vehicle electronic apparatus 1a, a power switch 4 such as an ignition switch, and a power relay 5 including an output contact 5a and an electromagnetic coil 5b, wherein the output contact 5a of this power relay 5 is closed by energization of the electromagnetic coil 5b to connect the on-vehicle battery 2 with the on-vehicle electronic apparatus 1a.

A first on-vehicle load 6 is connected to the on-vehicle battery 2 via an output contact 7a of a load relay 7. A third on-vehicle load 6b is connected to the on-vehicle battery 2 via an output contact 5a of the power relay 5. An electromagnetic coil 7b of the load relay 7 is configured so that the output contact 7a will be closed if the electromagnetic coil 7b is energized.

Moreover, the inside of the on-vehicle electronic apparatus 1a is configured as follows.

The microprocessor 10 is provided as a first controlling means incorporating various unillustrated memories and so on wherein a large number of signals are inputted and outputted. A power unit 11 supplies a sleep power supply P1, an operating power supply P2, and an ON/OFF signal input switch of the power switch 4 and so on to a microprocessor 10. A watchdog timer (WDT) 12 is provided as a monitoring means for receiving supply of a watchdog signal WD periodically generating an ON/OFF pulse when the microprocessor 10 is in normal operation and for generating reset pulse output RST2 when the watchdog signal WD stops operation[, 12a is a]. A one shot timer (TM) 12a is provided for generating reset pulse output RST1 on startup of the operating power supply P2. An OR element 12b supplies reset pulse output RST1 or RST2 to reset input RST of the microprocessor 10 and thus initialize or restart the microprocessor 10.

A transistor 13a is provided for energizing the electromagnetic coil 5b. A first driving resistance 13b fed from the on-vehicle battery 2 via the power switch 4 drives the transistor 13a. A second driving resistance 13c fed from controlling output O1 of the microprocessor 10 drives the transistor 13a. A ballast resistance 13d is connected between emitter bases of the transistor 13a, where the controlling output O1 is a delay outputting means for continuously generating output for a while as mentioned later even if the power switch 4 is substantially opened.

A transistor 14a is provided for energizing the electromagnetic coil 7b. A driving resistance 14b fed from controlling output O2 of the microprocessor 10 drives the transistor 14a. A ballast resistance 14c is connected between the emitter bases of the transistor 14a.

A transistor 15a is provided for driving the first on-vehicle load 6a. A driving resistance 15b fed from controlling output O3 of the microprocessor 10 drives the transistor 15a. A ballast resistance 15c is connected between the emitter bases of the transistor 15a.

A memory element 16a is provided as storage means comprised of a flip-flop circuit set by the reset pulse output RST2. An output stopping circuit 16b is provided as output stopping means. An indicating lamp 16c fed by storage output of the memory element 16a drives the transistor 16d. A ballast resistance 16e is connected between the emitter bases of the transistor 16d. The output stopping circuit 16b is comprised of the indicating lamp 16c, the transistor 16d and the ballast resistance 16e. The indicating lamp 16c is a malfunction warning apparatus for informing the driver of operation of the memory element 16a.

Moreover, 17 is a fall detection element as resetting means for detecting that the power switch 4 changed from ON to OFF, where it is configured so that output of this fall detection element 17 resets the memory element 16a.

A transistor is provided for driving the third on-vehicle load 6b. A driving resistance 18b fed from controlling output O4 of the microprocessor 10 drives the transistor 18a. A ballast resistance 18c is connected between emitter bases of the transistor 18a.

Diodes 20a, 20b and 20c are provided for selectively connecting base terminals of the transistors 14a, 18a and 15a with collector terminals of the transistor 16d, where the transistor 16d is not necessarily connected to all the transistors 14a, 18a and 15a.

Figure 2:
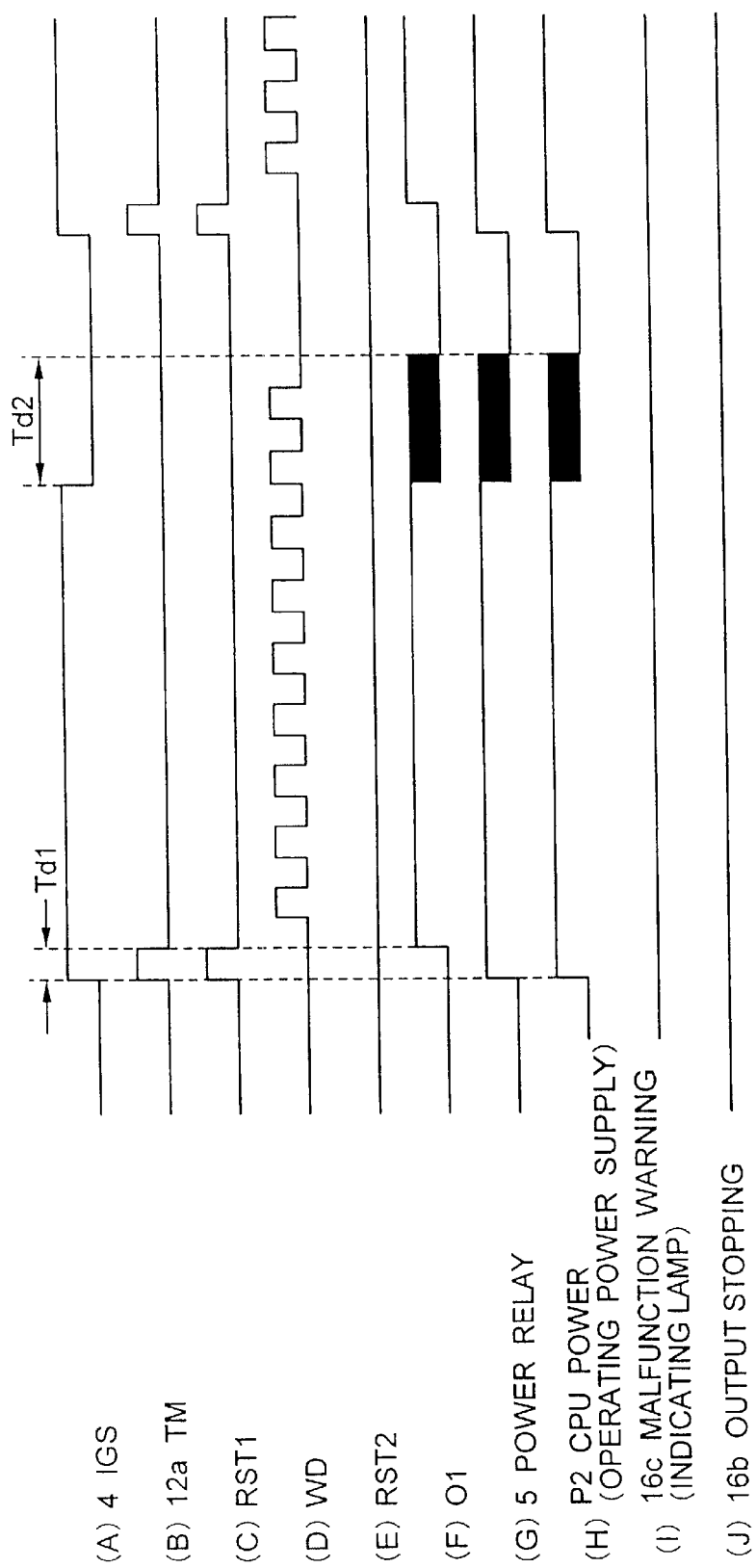
FIG. 2 is a time chart for describing normal operation of FIG. 1.

Next, the operation will be described by referring to time charts of FIG. 2 and FIG. 3. Moreover, a convex side of a waveform in the drawings indicates that a switch or a transistor is turned on or an output voltage is generated.

First, a case where the microprocessor 10 is in normal operation will be described by referring to FIG. 2.

FIG. 2A is an ON/OFF waveform of the power switch 4, and FIG. 2B is an output waveform of the one shot timer 12a, which waveform generates output of predetermined time Td1 in synchronization with OFF→ON of the power switch 4, and it is equivalent to the reset pulse output RST1 of FIG. 2C.

FIG. 2D is a waveform of a watchdog signal WD generated by the microprocessor 10, and it generates a pulse of a predetermined period since the microprocessor 10 is initialized by the reset pulse output RST1 until the operating power supply P2 of the microprocessor 10 is shut off, in which state the reset pulse output RST2 shown in FIG. 2E is not generated.

FIG. 2F is an output waveform of the controlling output O1 of the microprocessor 10, and it generates output since the microprocessor 10 is initialized by the reset pulse output RST2 and stops output after the power switch 4 is cut off delaying by delay time Td2.

Moreover, the delay time Td2 is the time, in the case where there is an actuator that needs to return to an initial position in the on-vehicle loads, until the operation of returning to the initial position is completed.

FIG. 2G and H indicate operation of the power relay 5 and a state of supply of the operating power supply P2 to the microprocessor 10, where they operate on throwing of the power switch 4 and becomes inoperative on stop of the controlling output O1.

FIG. 2I and J indicate operation of the indicating lamp 16c and the output stopping circuit 16b, where neither of them operates because the reset pulse output RST2 of FIG. 2E has never been generated.

Next, a case where the microprocessor 10 malfunctions will be described by referring to FIG. 3.

FIG. 3A is an ON/OFF waveform of the power switch 4, and FIG. 3B is an output waveform of the one shot timer 12a, which waveform generates output of predetermined time Td1 in synchronization with OFF→ON of the power switch 4, and it is equivalent to the reset pulse output RST1 of FIG. 3C.

FIG. 3D is a waveform of a watchdog signal WD generated by the microprocessor 10, and if the microprocessor 10 is initialized by the reset pulse output RST1, it generates a periodic pulse for a while.

If this watchdog signal is stopped due to a noise malfunction and so on, however, the watchdog timer 12 operates so that the reset pulse output RST2 is generated only for predetermined time Tr as shown in FIG. 3E.

FIG. 3F is a waveform of the controlling output O1 of the microprocessor 10, and it generates output after the microprocessor 10 is initialized by the reset pulse output RST1, where it normally stops output delaying by delay time Td2 after the power switch 4 is cut off and yet stops output while the reset pulse output RST2 is in operation.

FIG. 3G and H indicate operation of the power relay 5 and a state of supply of the operating power supply P2 to the microprocessor 10, where they operate on throwing of the power switch 4 and becomes inoperative on stop of the controlling output O1.

While the reset pulse output RST2 is in operation and the controlling output O1 is stopping, however, the power relay 5 continues operation because the power switch 4 is still ON, and so the operating power supply P2 does not stop.

FIG. 3I and J indicate operation of the indicating lamp 16c and the output stopping circuit 16b, where they operate when the reset pulse output RST2 of FIG. 3E is generated and are reset by the fall detection element 17 when the power switch 4 is opened.

Moreover, while operation of the memory element 16a can be reset by reclosing the power switch 4, the abnormality indicating lamp 16c and the output stopping circuit 16b shown in FIG. 3I and J continue operation even during the delay time Td2 in this case, and so output remains stopped as to an actuator load that needs to return to the initial position so that the return to the initial position becomes impossible.

Therefore, if the operation of the memory element 16a is allowed to be reset by opening the power switch 4 as mentioned above, the output stopping circuit becomes inoperative on opening of the power switch 4 so that it becomes possible to return to the initial position during the delay time Td2.

Furthermore, when the output stopping circuit 16b is in operation, some of the load driving transistors (driving elements) to which the diodes 20a, 20b and 20c in FIG. 1 are connected are inoperative.

Thus, this embodiment provides a watchdog timer for monitoring a watchdog signal of a microprocessor to generate reset pulse output on a malfunction of the microprocessor and restart it, and an output stopping circuit for stopping operation of a load relay provided on a feeder circuit to the loads in response to operation of a memory element for storing generation of reset pulse output, which memory element is configured to be reset on opening or reclosing of a power switch so that it is capable of, in the case of a runaway of the microprocessor, immediately attempting to reset and restart it and also forcing only the operation of loads to which a malfunction is detrimental to stop and releasing the forced stop by shutting off or reclosing of the power switch.

In addition, an on-vehicle electronic apparatus with a built-in microprocessor is fed from an on-vehicle battery via a power relay operating on closing of a manually-operated power switch such as an ignition switch, which power relay is configured to continue operation, after opening of the power switch, until part of on-vehicle loads return to the initial position, and it also provides an output stopping circuit for stopping operation of a load relay provided on a feeder circuit to the loads in response to operation of the memory element for storing generation of reset pulse output to the microprocessor, which memory element is reset on opening of the power switch so that it is capable of, even in the case of a forcedly stopped load, releasing the forced stop when the power switch is cut off and the engine is stopping so as to allow the actuator to return to the initial position.

Embodiment 2

Figure 4:
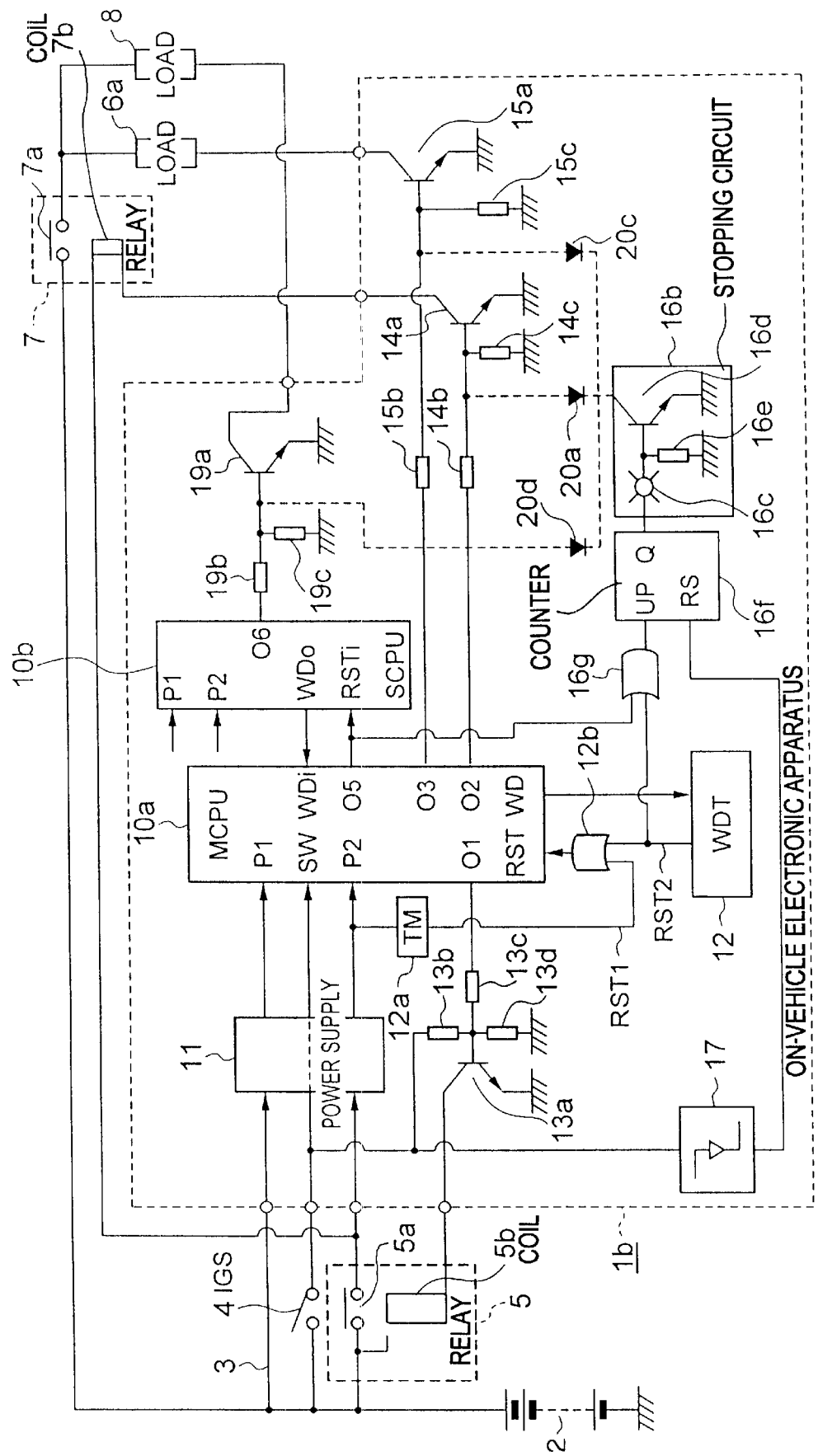
FIG. 4 is a block circuit diagram showing an embodiment 2 of the present invention.

FIG. 4 is a block diagram showing an embodiment 2 of the present invention. In FIG. 4, the portions corresponding to FIG. 1 are given the same symbols and detailed description of them is omitted.

In this drawing, 10b is a sub-microprocessor for operating by receiving supply of the sleep power supply P1 and the operating power supply P2, and a watchdog signal WDo of this sub-microprocessor 10b is supplied to a monitored input WDi of the microprocessor 10a. If the watchdog signal WDo stops, the microprocessor 10a generates reset pulse output O5 and restarts the sub-microprocessor 10b via reset input RSTi of the sub-microprocessor 10b.

Moreover, in reality, a logical sum of the reset pulse output RST1 and RST 2 is substantially supplied to the reset input RSTi of the sub-microprocessor 10b.

A second on-vehicle load 8 is connected to the on-vehicle battery 2 via an output contact 7a of a load relay 7. A transistor 19a is provided for driving the second on-vehicle load 8. A driving resistance 19b fed from controlling output O6 of the sub-microprocessor 10b drives the transistor 19a. A ballast resistance 19c is connected between the emitter bases of the transistor 19a.

A counter 16f, having up-count input UP and current value reset input RS, counts a pulse output of a logical sum element 16g which receives as inputs the reset pulse output RST2 from the watchdog timer 12 and the reset pulse output O5 from the microprocessor 10a so as to generate storage output Q if the count reaches a predetermined set value, and thus is a memory element for storing the reset pulses a plurality of number of times.

If the counter (memory element) 16f generates storage output Q, the indicating lamp 16c lights up and the output stopping circuit 16b operates, and this counter 16f is reset by output of the fall detection element 17 and also the indicating lamp 16c and the output stopping circuit 16b become inoperative.

Moreover, a diode 20d is connected as required between the base terminals of the transistor 19a and collector terminals of the transistor 16d.

Unlike the above embodiment 1, this embodiment has the second on-vehicle load 8 controlled by the sub-microprocessor 10b, and the counter 16f that is a memory element operates by either the reset pulse output RST2 for the microprocessor 10a as main or the reset pulse output O5 for the sub-microprocessor 10b so that the output stopping circuit 16b and the indicating lamp 16c will operate.

In addition, the output stopping circuit 16b and the indicating lamp 16c will only operate by a plurality of number of times of reset pulse output according to what the set value of the counter 16f is.

Moreover, as a load to be controlled by the sub-microprocessor 10b, there can be a load connected to the on-vehicle battery 2 via the output contact 5a of the power relay 5, not by way of the output contact of the load relay 7. To be more specific, as for a common connection point of the on-vehicle load 8 and the on-vehicle load 6, they can be directly connected to the output contact 5a of the power relay 5 not via the load relay 7.

Figure 3:
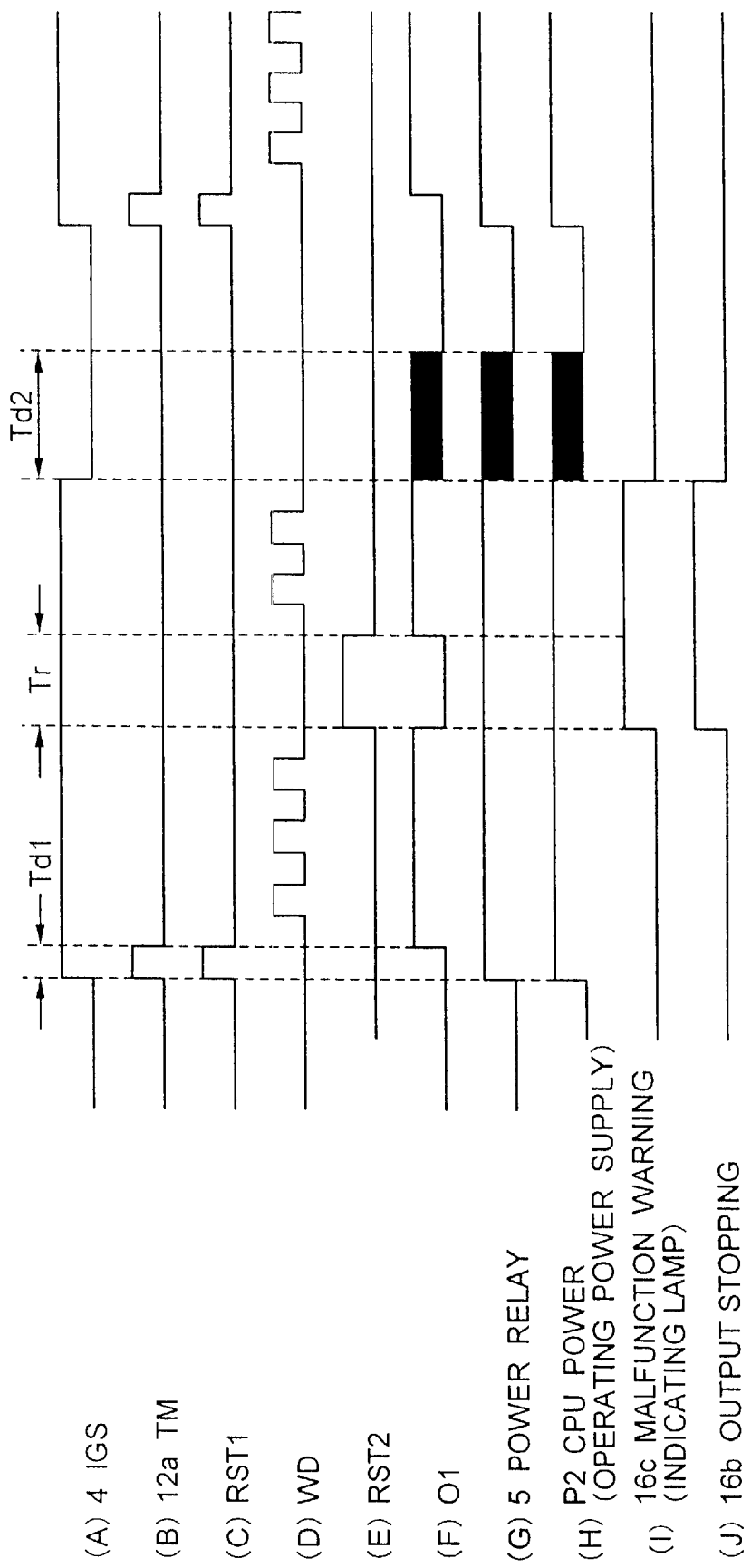
FIG. 3 is a time chart for describing abnormal operation of FIG. 1.

Moreover, in each of the embodiments shown in FIGS. 1 and 3, the first on-vehicle loads 6a are quite a few things such as a solenoid valve for fuel injection and a solenoid valve for automatic transmission.

Likewise, there are quite a few loads, such as an inlet valve controlling motor for auto-cruise as the second on-vehicle loads 8, and an idle speed controlling motor, an ignition coil and an electric heater for an exhaust gas sensor as the third loads 6b.

Of these loads, an inlet valve controlling motor for auto-cruise and an idle speed controlling motor are the loads for which the actuator should preferably be returned to the initial position after stopping the engine.

In addition, as a role of the load relay 7, in the case of a short circuit accident of a load or a short circuit failure of a driving element for instance, it is used as backup means for shutting off the feeder circuit by the load relay 7, and it is provided on the loads such as the above inlet valve controlling motor, solenoid valve for automatic transmission and solenoid valve for fuel injection.

Thus, this embodiment provides a sub-microprocessor for controlling a plurality of on-vehicle loads other than the first and third on-vehicle loads, that is, the second on-vehicle loads, and as monitoring of the sub-microprocessor and restarting reset thereof on a malfunction are performed by the main microprocessor, whichever processor malfunctions or runs away, it will be immediately restarted by the reset pulse output and also this state can be stored so as to continuously stop output of part of the on-vehicle loads.

Embodiment 3

As for this type of on-vehicle electronic apparatuses, in the case of a continuous abnormality due to breakage of hardware of the electronic control circuit section including the microprocessor and a temporary abnormality due to noise malfunction and so on, a pull-up resistor or a pull-down resistor is connected to an input section immediately before a load driving element so that the loads operate on the safe side on occurrence of an abnormality or a gate circuit for stopping output by the operation permitting signal is provided for instance, as a general measure.

The above operation permitting signal operates because the watchdog signal of the microprocessor is normally turned on and off, and it is provided, though not required for all the on-vehicle loads, in a driving circuit section of the solenoid valve for fuel injection for instance.

Such an operation permitting signal becomes effective again and starts to control the loads, if the microprocessor is restarted by the reset pulse output.

As opposed to it, the output stopping circuit according to the present invention is kept in an output stopping state by reset pulse output of once or a plurality of times, and continues to stop output even if the microprocessor is restarted and returns to normal, which stopping state is not reset until the power switch is opened or reclosed.

As for an on-vehicle load for which such output stopping control is desirable, while an inlet valve controlling motor for auto-cruise can be named for instance, a system paying attention to keeping a vehicle from becoming indiscriminately uncontrollable by appropriately maintaining an output stopping state during a malfunction by the above operation permitting signal will be constructed.

In addition, while the above embodiment is described in connection with the engine control, it is also applicable to various other vehicle control, and it is desirable, as for an electronic apparatus related to improvement of reliability such as a forward, backward and sideward monitoring and controlling apparatus of a vehicle, to stop operation and warn the driver of any abnormality, even if occurring just once, by the indicating lamp, beeper and so on.

What is claimed is:

1. A vehicle controlling apparatus, comprising:

a manually-operated power switch for on-vehicle engine operation;

first controlling means for controlling a plurality of on-vehicle loads, said first controlling means being supplied with power from an on-vehicle battery when the power switch is closed;

monitoring means for monitoring operation of the first controlling means and generating a reset pulse to restart said first controlling means when a malfunction occurs in said first controlling means;

storage means for storing the reset pulse generated by the monitoring means; and output stopping means for stopping operation of a load relay provided on a feeder circuit to said on-vehicle loads in response to operation of the storage means; and wherein said storage means is reset on opening or reclosing of said power switch.

2. The vehicle controlling apparatus according to claim 1, further comprising:

a power relay for supplying power to said first controlling means from said on-vehicle battery when said manually-operated power switch is closed;

delay outputting means for continuing operation of said power relay after said power switch is opened until part of said on-vehicle loads returns to an initial position based on output of said first controlling means; and resetting means for resetting said storage means when said power switch is opened.

3. The vehicle controlling apparatus according to claim 1, further comprising:

second controlling means for controlling on-vehicle loads other than said plurality of on-vehicle loads, wherein said first controlling means monitors operation of said second controlling means and generates a reset pulse to restart said second controlling means.

4. The vehicle controlling apparatus according to claim 3, wherein said storage means operates based on logical sum output of said reset pulse generated by said monitoring means and said reset pulse generated by said first controlling means.

5. The vehicle controlling apparatus according to claim 3, wherein said storage means counts the number of times of said reset pulses are provided to said first or second controlling means, and operates said output stopping means when said number of times exceeds a predetermined number to stop operation of said load relay.

6. The vehicle controlling apparatus according to claim 3, further comprising a malfunction warning means for, in response to the operation of said storage means, providing an indication that said first or second controlling means are malfunctioning and restarted by a reset operation.

7. The vehicle controlling apparatus according to claim 1, wherein a said monitoring means comprises a watchdog timer.

* * * * *